United States Patent
Ni et al.

(10) Patent No.: US 11,523,274 B2
(45) Date of Patent: Dec. 6, 2022

(54) DATA TRANSMISSION METHOD, USER EQUIPMENT, AND CONTROL PLANE NODE

(71) Applicant: Huawei Technologies Co., Ltd., Shenzhen (CN)

(72) Inventors: Hui Ni, Beijing (CN); Yongcui Li, Beijing (CN); Jiangwei Ying, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 10 days.

(21) Appl. No.: 16/586,373

(22) Filed: Sep. 27, 2019

(65) Prior Publication Data

US 2020/0029207 A1 Jan. 23, 2020

Related U.S. Application Data

(63) Continuation of application No. PCT/CN2017/078261, filed on Mar. 27, 2017.

(51) Int. Cl.
*H04W 12/037* (2021.01)
*H04L 12/46* (2006.01)
(Continued)

(52) U.S. Cl.
CPC ....... *H04W 12/037* (2021.01); *H04L 12/4633* (2013.01); *H04L 63/0428* (2013.01); *H04L 67/141* (2013.01); *H04W 12/033* (2021.01)

(58) Field of Classification Search
CPC ... H04W 12/00–80; H04L 63/04–0492; H04L 63/16–168; H04L 63/20–205; H04L 12/4633; H04L 67/141
See application file for complete search history.

(56) References Cited

U.S. PATENT DOCUMENTS

| 6,094,485 A | 7/2000 | Weinstein et al. |
| 9,027,076 B2 * | 5/2015 | Roach ................... H04L 63/107 726/1 |

(Continued)

FOREIGN PATENT DOCUMENTS

| CN | 101052037 A | 10/2007 |
| CN | 101087248 A | 12/2007 |

(Continued)

OTHER PUBLICATIONS

V. K. Choyi, A. Abdel-Hamid, Y. Shah, S. Ferdi and A. Brusilovsky, "Network slice selection, assignment and routing within 5G Networks," 2016 IEEE Conference on Standards for Communications and Networking (CSCN), 2016, pp. 1-7, doi: 10.1109/CSCN.2016.7784887. (Year: 2016).*

(Continued)

*Primary Examiner* — Madhuri R Herzog
(74) *Attorney, Agent, or Firm* — Leydig, Voit & Mayer, Ltd.

(57) ABSTRACT

Embodiments of the present disclosure relate to a data transmission method, user equipment, and a control plane node. User equipment (UE) determines a security attribute of a session of the UE; the UE sends a session establishment request message to a control plane node when the security attribute of the session of the UE does not meet a security requirement of an application. The session establishment request message is used to request to establish a session corresponding to the security requirement of the application. Embodiments of the disclosed method reduce an unnecessary signaling exchange caused by establishment of a new session in a data transmission process to facilitate meeting requirements of different services.

20 Claims, 9 Drawing Sheets

(51) Int. Cl.
*H04L 9/40* (2022.01)
*H04L 67/141* (2022.01)
*H04W 12/033* (2021.01)

(56) References Cited

U.S. PATENT DOCUMENTS

| | | | |
|---|---|---|---|
| 9,935,769 B1* | 4/2018 | Mehr | H04L 9/14 |
| 10,735,956 B2* | 8/2020 | Bae | H04W 12/04 |
| 2002/0087729 A1* | 7/2002 | Edgar | H04L 69/08 |
| | | | 709/246 |
| 2010/0325419 A1 | 12/2010 | Kanekar | |
| 2013/0095796 A1 | 4/2013 | Cho et al. | |
| 2014/0324931 A1 | 10/2014 | Grube et al. | |
| 2015/0052348 A1* | 2/2015 | Moskowitz | H04L 63/0428 |
| | | | 713/151 |
| 2015/0128205 A1* | 5/2015 | Mahaffey | H04L 63/105 |
| | | | 726/1 |
| 2016/0044002 A1 | 2/2016 | Ying et al. | |
| 2017/0013459 A1 | 1/2017 | Chen et al. | |
| 2018/0332047 A1* | 11/2018 | Shah | H04L 63/0464 |
| 2019/0334820 A1 | 10/2019 | Zhao | |

FOREIGN PATENT DOCUMENTS

| | | | | | |
|---|---|---|---|---|---|
| CN | 101242629 A | 8/2008 | | | |
| CN | 101355811 A | 1/2009 | | | |
| CN | 101572951 A | 11/2009 | | | |
| CN | 101895882 A | 11/2010 | | | |
| CN | 103404102 A | 11/2013 | | | |
| CN | 104378374 A | * | 2/2015 | ......... | H04L 63/0869 |
| CN | 105701407 A | 6/2016 | | | |
| CN | 105898894 A | 8/2016 | | | |
| CN | 105959317 A | 9/2016 | | | |
| CN | 106341832 A | 1/2017 | | | |
| CN | 108306831 A | 7/2018 | | | |
| WO | 03036913 A2 | 5/2003 | | | |
| WO | 2008098515 A1 | 8/2008 | | | |
| WO | 2014169451 A1 | 10/2014 | | | |

OTHER PUBLICATIONS

"3rd Generation Partnership Project; Technical Specification Group Services and System Aspects; Study on the security aspects of the next generation system (Release 14)," 3GPP TR 33.899 V1.0.0, pp. 1-471, 3rd Generation Partnership Project, Valbonne, France (Mar. 2017).

"3d Generation Partnership Project;Technical Specification Group Services and System Aspects; Study on Architecture for Next Generation System (Release 14)," 3GPP TR 23.799 V14.0.0, pp. 1-522, 3rd Generation Partnership Project, Valbonne, France (Dec. 2016).

* cited by examiner

DATA TRANSMISSION METHOD, USER EQUIPMENT, AND CONTROL PLANE NODE

CROSS-REFERENCE TO RELATED APPLICATIONS

This application is a continuation of International Application No. PCT/CN2017/078261, filed on Mar. 27, 2017, the disclosure of which is hereby incorporated by reference in its entirety.

TECHNICAL FIELD

Embodiments of this application relate to the communications field, and in particular, to a data transmission method, user equipment, and a control plane node.

BACKGROUND

End to end (E2E) security protection can implement security protection in a user data transmission process. A base station between a terminal device (such as user equipment) and a network device (such as the base station) is in a low-security area and is vulnerable to attacks, causing leakage of user privacy. An E2E protection link may be deployed at a gateway between the terminal device and the base station to improve security of user data. Moreover, the E2E security protection can meet differentiated security requirements of different applications and implement security isolation between different slices or services.

However, during the E2E security protection, the following phenomenon may exist: Different services may correspond to different security requirements. For example, user equipment (UE) has a plurality of sessions. When the UE initiates a new service, the UE cannot determine whether to reuse an existing session of the UE or to initiate a new session establishment process. In addition, different security requirements may correspond to different user plane protocol stacks. However, in the prior art, a problem of how the UE selects a suitable user plane protocol stack for data transmission is not resolved.

SUMMARY

Embodiments of the present disclosure provide a data transmission method, user equipment, and a control plane node, to reduce an unnecessary signaling exchange caused by establishment of a new session in a data transmission process, thereby meeting requirements of different services.

According to a first aspect, a data transmission method is provided. The method may include: determining, by user equipment (UE), a security attribute of a session of the UE; and sending, by the UE, a session establishment request message to a control plane node when the security attribute of the session of the UE does not meet a security requirement of an application, where the session establishment request message is used to request to establish a session corresponding to the security requirement of the application. Based on the security requirement of the application, the UE determines whether the session of the UE corresponds to the security requirement of the application. When the security attribute of the UE does not meet the security requirement of the application, a session establishment process is triggered to establish a session corresponding to the security requirement, to meet requirements of different services.

In an optional implementation, the security attribute may include at least one security parameter of: a security algorithm (such as an encryption algorithm of a data encryption standard, or an encryption algorithm of an advanced encryption standard), a key length (such as 256 bits or 128 bits), and an encrypted location (such as an Internet protocol field or a transmission control protocol field). The security requirement of the application may also include at least one security parameter of: a security algorithm, a key length, and an encrypted location.

In an optional implementation, after the sending, by the UE, a session establishment request message to a control plane node, the method further includes: receiving, by the UE, a session establishment response message from the control plane node, where the session establishment response message may include a security attribute of the session corresponding to the security requirement of the application; and sending, by the UE, data of the application based on the security attribute of the session corresponding to the security requirement of the application.

In an optional implementation, the security attribute of the session corresponding to the security requirement of the application includes the encrypted location, and the sending, by the UE, data of the application based on the security attribute of the session corresponding to the security requirement of the application includes: determining, by the UE, an encapsulation format of the data of the application based on the encrypted location; and generating, by the UE, a data packet based on the encapsulation format of the data of the application and the data of the application, and sending the data packet.

In an optional implementation, the security attribute of the session corresponding to the security requirement of the application may be a security attribute of a slice corresponding to the session corresponding to the security requirement of the application.

In an optional implementation, the session establishment response message may further include user plane protocol stack indication information, and the user plane protocol stack indication information is used to indicate the encapsulation format of the data of the application.

In an optional implementation, the security attribute of the session may be the security attribute of the slice corresponding to the session.

In an optional implementation, before the determining, by UE, a security attribute of a session of the UE, the method may further include: sending, by the UE, a registration request message to the control plane node; and receiving, by the UE, a registration response message from the control plane node, where the registration response message may include a security attribute of a slice accessible by the UE, and the security attribute of the slice accessible by the UE may include the security attribute of the slice corresponding to the session.

In an optional implementation, the method may further include: when a security attribute of at least one of the session meets the security requirement of the application, sending, by the UE, the data of the application through one of the at least one session.

According to a second aspect, another data transmission method is provided. The method may include: receiving, by a control plane node, a session establishment request message sent by user equipment UE, where the session establishment request message is used to request to establish a session corresponding to a security requirement of an application of the UE; and sending, by the control plane node, a session establishment response message to the UE based on the session establishment request message, where the session establishment response message may include a security attribute of the session corresponding to the security requirement of the application. According to the method, the UE can determine, based on the security requirement of the application, whether the session of the UE corresponds to the security requirement of the application. When the security attribute of the UE does not meet the security requirement of the application, a session establishment process is triggered to establish a session corresponding to the security requirement, to meet requirements of different services.

In an optional implementation, the security attribute may include at least one security parameter of: a security algorithm, a key length, and an encrypted location. The security requirement of the application may also include at least one security parameter of: a security algorithm, a key length, and an encrypted location.

In an optional implementation, the security attribute of the session corresponding to the security requirement of the application may be a security attribute of a slice corresponding to the session corresponding to the security requirement of the application.

In an optional implementation, the session establishment request message may include session management-network slice selection assistance information; and the method may further include: determining, by the control plane node based on the session management-network slice selection assistance information, the security attribute of the session corresponding to the security requirement of the application.

In an optional implementation, the session establishment request message may include the security requirement of the application; and the method may further include: determining, by the control plane node based on the security requirement of the application, the security attribute of the session corresponding to the security requirement of the application.

In an optional implementation, the session establishment request message may further include a security capability of the UE; and the determining, by the control plane node based on the security requirement of the application, the security attribute of the session corresponding to the security requirement of the application includes: determining, by the control plane node based on the security requirement of the application and the security capability of the UE, the security attribute of the session corresponding to the security requirement of the application.

In an optional implementation, the method may further include: determining, by the control plane node based on a local configuration policy, the security attribute of the session corresponding to the security requirement of the application; or receiving, by the control plane node, the security attribute of the session corresponding to the security requirement of the application from a subscription server; or receiving, by the control plane node, an index from a policy decision node, and determining, based on the index, the security attribute of the session corresponding to the security requirement of the application.

In an optional implementation, the session establishment response message may further include user plane protocol stack indication information, and the user plane protocol stack indication information may be used to indicate a user plane protocol stack used by the session corresponding to the security requirement of the application. The user plane protocol stack may be used to decide an encapsulation format of the data of the application.

In an optional implementation, before the receiving, by a control plane node, a session establishment request message sent by UE, the method may further include: receiving, by the control plane node, a registration request message from the UE, where the registration request message may include configured network slice selection assistance information; determining, by the control plane node based on the configured network slice selection assistance information, a security attribute of a slice accessible by the UE; and sending, by the control plane node, a registration response message to the UE, where the registration response message may include the security attribute of the slice accessible by the UE.

According to a third aspect, user equipment is provided. The user equipment has a function of implementing actions of the user equipment in the foregoing method implementations. The function may be implemented by using hardware, or may be implemented by hardware executing corresponding software. The hardware or the software includes one or more modules corresponding to the foregoing function.

According to a fourth aspect, a control plane node is provided. The control plane node has a function of implementing actions of the control plane node in the foregoing method implementations. The function may be implemented by using hardware, or may be implemented by hardware executing corresponding software. The hardware or the software includes one or more modules corresponding to the foregoing function.

According to a fifth aspect, another user equipment is provided. The user equipment may include a processor and a transmitter; the processor is configured to determine a security attribute of a session of user equipment UE; and the processor is further configured to send, when the security attribute of the session of the UE does not meet a security requirement of an application, a session establishment request message to a control plane node by using the transmitter, where the session establishment request message is used to request to establish a session corresponding to the security requirement of the application.

The user equipment may further include a memory, and the memory is configured to: couple to the processor and store a program instruction and data that are necessary to the user equipment. The processor is configured to execute a program in the memory, to perform actions related to the UE in the foregoing aspects.

According to a sixth aspect, a computer storage medium is provided, and is configured to store a computer software instruction used by the foregoing user equipment. The computer storage medium includes a program configured to perform actions related to the UE in the foregoing aspects.

According to a seventh aspect, a control plane node is provided. The control plane node may include a processor, a transmitter, and a receiver. The processor is configured to receive, by using the receiver, a session establishment request message sent by UE, where the session establishment request message is used to request to establish a session corresponding to a security requirement of an application of the UE; and the processor is further configured to send, based on the session establishment request message, a session establishment response message to the UE by using the transmitter, where the session establishment response message includes a security attribute of the session corresponding to the security requirement of the application. The control plane node may further include a memory, and the memory is configured to: couple to the processor and store a program instruction and data that are necessary to the control plane node. The processor is configured to execute a program in the memory, to perform actions related to the control plane node in the foregoing aspects.

According to another aspect, a computer storage medium is provided, and is configured to store a computer software instruction used by the foregoing control plane node. The computer storage medium includes a program configured to perform actions related to the control plane node in the foregoing aspects.

DESCRIPTION OF EMBODIMENTS

The technical solutions of this application are further described in detail with reference to the accompanying drawings and embodiments.

Figure 1:
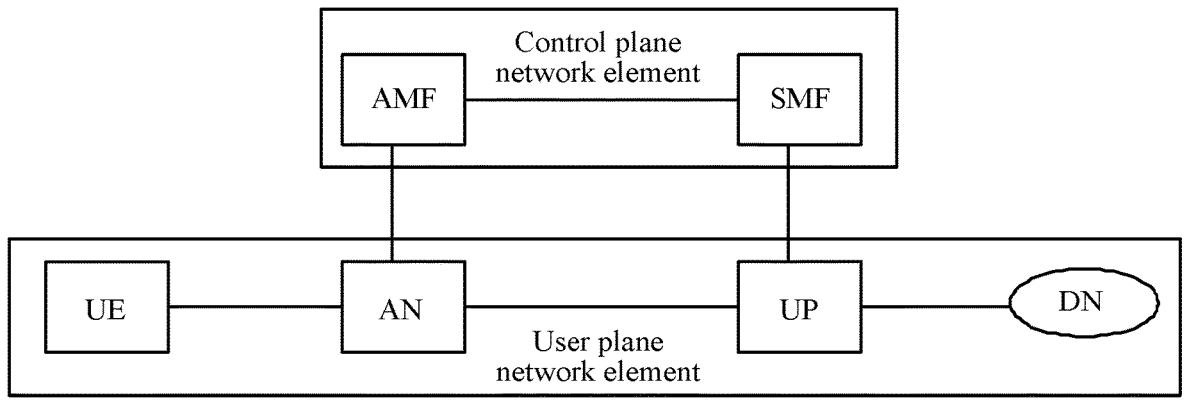
FIG. 1 is a schematic structural diagram of a provided protection link.

A data transmission method provided in this application is applied to an end-to-end security protection link in a radio communication scenario. As shown in FIG. 1, a structure of the protection link may include a user plane node and a control plane node. The user plane node may include a terminal device, an access network (AN) device, a forwarding plane node (UP), and a data network (DN). The control plane node may include an access and mobility management function (AMF) entity and a session management function (SMF) entity.

A terminal device in this application may include various handheld devices, in-vehicle devices, wearable devices, and computing devices that have a radio communication function, various forms of user equipments (UE), and the like. An access network device in this application includes but is not limited to an evolved NodeB (eNB or eNodeB), a wireless fidelity access point (WiFi AP), worldwide interoperability for microwave access (WiMAX), a base station (BS), and the like. For ease of description, the foregoing terminal devices in this application may be collectively referred to as UE.

The UP entity is configured to process and forward a packet. The UP entity may be a forwarding plane function of a packet data network gateway (PDN GW), a forwarding plane function of a serving gateway (S-GW), or a physical or virtual forwarding device such as a router or a switch.

The DN is configured to: process and forward a packet, and provide a data transmission service for a user. The DN may be a packet data network (PDN) such as the Internet or an IP multi-media service (IMS).

The AMF entity is used for mobility management and forwarding path management in a mobile network, for example, delivering a packet forwarding policy to the UP and instructing the UP to process and forward the packet based on the packet forwarding policy.

The SMF entity is used for session management, such as establishment, modification, and release of a session, UE IP address allocation, or user plane node selection or reselection, in a mobile network.

It should be noted that the entities such as the UP entity, the AMF entity, and the SMF entity in the present disclosure may exist in a form of a virtual machine or a physical machine. This is not limited in this application.

Figure 2:
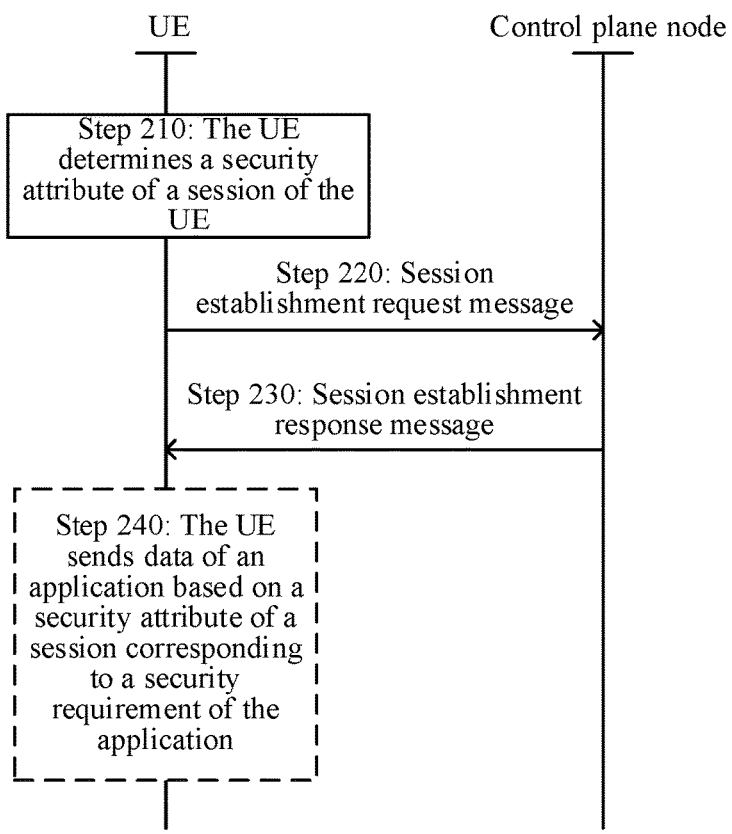
FIG. 2 is a signaling exchange diagram of a data transmission method according to an embodiment of the present disclosure.

FIG. 2 is a signaling exchange diagram of a data transmission method according to an embodiment of the present disclosure. As shown in FIG. 2, the method may include the following steps.

Step 210: UE determines a security attribute of a session (established session) of the UE.

The session may be in an idle state or an active state.

Optionally, the security attribute may include at least one security parameter of: a security algorithm, a key length, and an encrypted location. The security algorithm may include an encryption algorithm of a data encryption standard (DES), an encryption algorithm of an advanced encryption standard (AES), a ZU Chongzhi (ZUC) encryption algorithm, a (Ron Rivest, Adi Shamir and Leonard Adleman, RSA) encryption algorithm, or an encryption-less algorithm.

The key length may be 256 bits (bit), 128 bits, 64 bits, or 0 bits (namely, a keyless field).

The encrypted location (or referred to as encrypted field) may be an Internet protocol (internet protocol, IP) field or a transmission control protocol (TCP) field (or a user datagram protocol (UDP)). For example, the security parameter of the encrypted location may be embodied as an encrypted IP field or an unencrypted IP field, an encrypted TCP field or an unencrypted TCP field, or a combination of an encryption status of a corresponding IP field and an encryption status of a corresponding TCP field.

The key length security algorithm may include an AES encryption algorithm with a 128-bit key length, an AES encryption algorithm with a 256-bit key length, or an RSA encryption algorithm with a 512-bit key length.

Optionally, the UE may determine the security attribute of the session of the UE by obtaining the security attribute of the session of the UE. For example, the UE may obtain the security attribute of the session of the UE through a session establishment process or a registration process, or obtain the security attribute of the session of the UE from a memory of the UE. This is not limited.

Optionally, the security attribute of the session may alternatively be a security attribute of a slice corresponding to the session. To be specific, the security attribute of the session may be the security attribute of the slice corresponding to the session. In other words, the security attribute of the session may be the security attribute of the slice that serves the session.

Optionally, before the UE determines the security attribute of the session of the UE, the security attribute of the slice corresponding to the session may be obtained through a registration process. The registration process is a process in which the UE is registered with an operator network to obtain an operator service.

In an example, the UE sends a registration request message to a control plane node, and the registration request message includes configured network slice selection assistance information (Configured Network slice selection assistance information, Configured NSSAI), so that the control plane node determines, based on the network slice selection assistance information, a security attribute of a slice accessible by the UE, and then sends a registration response message to the UE. The registration response message may include the security attribute of the slice accessible by the UE, and the security attribute of the slice accessible by the UE corresponds to a security attribute of at least one session.

The UE starts an application (APP). When a security attribute of at least one of the session meets a security requirement of the application, the UE sends data of the application through one of the at least one session.

Step 220: The UE sends a session establishment request message to the control plane node when the security attribute of the session of the UE does not meet a security requirement of an application.

The session establishment request message may be used to request to establish a session corresponding to the security requirement of the application.

Correspondingly, the control plane node receives the session establishment request message sent by UE.

The application may be an application started by a user by using the UE, such as a Baidu web page or Sina Weibo. The security requirement of the application may be configured by an operator on the UE or configured by a manufacturer of the UE on the UE.

Optionally, the security requirement of the application may include at least one security parameter of: a security algorithm, a key length, and an encrypted location.

The security parameter included in the security requirement of the application may be the same as or different from the security parameter included in the security attribute of the session.

In an example, when the security parameter included in the security requirement of the application is the same as the security parameter included in the security attribute of the session or the security requirement of the application is lower than the security attribute of the session, the UE determines that the security attribute of the session corresponds to the security requirement of the application of the UE. In this case, data of the application may be transmitted through the session, to be specific, the UE reuses the session.

In another example, when the security parameter included in the security requirement of the application is different from the security parameter included in the security attribute of the session, the UE determines that the security attribute of the session does not meet the security requirement of the application of the UE. To be specific, data of the application cannot be transmitted on the session, so that step 220 is performed.

For example, if the security algorithm in the security attribute of the session is a DES encryption algorithm and the security algorithm in the security requirement of the application is an AES encryption algorithm, because the two encryption algorithms are different, the application just initiated by the UE cannot be run on the session.

If the key length in the security attribute of the session is 64 bits and the key length in the security requirement of the application is 256 bits, because the 64-bit length is far less than the 256-bit length, the application just initiated by the UE cannot be run on the session.

If the key length in the security attribute of the session is 256 bits and the key length in the security requirement of the application is 64 bits, because the 64-bit length is far less than the 256-bit length, the application just initiated by the UE can be run on the session.

If the key length and the security algorithm in the security attribute of the session are a 128-bit key length and the AES encryption algorithm respectively and the key length and the security algorithm in the security requirement of the application are a 512-bit key length and the AES encryption algorithm respectively, because the encryption algorithms in the security attribute of the session and security requirement of the application are the same, but the key length in the security attribute of the session is less than the key length in the security requirement of the application, the application just initiated by the UE cannot be run on the session.

Optionally, the security attribute of the session may be a security attribute of a slice corresponding to the session. The security attribute of the session corresponding to the security requirement of the application may be a security attribute of a slice corresponding to the session corresponding to the security requirement of the application.

The control plane node may be an AMF entity, or an SMF entity, or both an AMF entity and an SMF entity. The session establishment request message is used to request to establish the session corresponding to the security requirement of the application, to perform data transmission.

Step 230: The control plane node sends a session establishment response message to the UE based on the session establishment request message.

The session establishment response message includes the security attribute of the session corresponding to the security requirement of the application.

Optionally, the session establishment response message includes indication information, but does not include the security attribute of the session corresponding to the security requirement of the application. The indication information is used to instruct the UE to send the data of the application based on the security requirement of the application. For example, when the security attribute corresponding to the session is the same as the security requirement of the application, the session establishment response message may include only the indication information.

In an implementation scenario, the session establishment request message includes the security requirement of the application.

Optionally, step 230 includes: determining, by the control plane node based on the security requirement of the application, the security attribute of the session corresponding to the security requirement of the application.

The control plane node may determine, in the following manners based on the security requirement of the application, the security attribute of the session corresponding to the security requirement of the application. Specifically, the following manners may be used.

Manner (1): The control plane node determines, based on a local configuration policy, the security attribute of the session corresponding to the security requirement of the application.

The operator performs initialized configuration on the control plane node, and configures a table of a correspondence between a security requirement of an application and a security attribute of a session, as shown in Table 1.

TABLE 1

| Security requirement of an application | Security attribute of a session |
|---|---|
| A | X |
| B | Y |

In Table 1, when a security requirement of an application that is received by the control plane node is A, if a security attribute of a session corresponding to the security requirement A of the application, as found by the control plane node in the local configuration policy table is X, the control plane node determines that the security attribute X of the session is the security attribute of the session corresponding to the security requirement A of the application. When a security requirement of an application that is received by the control plane node is B, if a security attribute of a session corresponding to the security requirement B of the application, as found by the control plane node in the local configuration policy table is Y, the control plane node determines that the security attribute Y of the session is the security attribute of the session corresponding to the security requirement B of the application.

Manner (2): The control plane node receives the security attribute of the session corresponding to the security requirement of the application from a subscription server.

The operator performs initialized configuration on the subscription server, and configures a table of a correspondence between a security requirement of an application and a security attribute of a session, as shown in Table 1.

The control plane node sends a security attribute obtaining request message to the subscription server, and the obtaining request message may include the security requirement of the application. The subscription server obtains, through querying in the correspondence table based on the received security requirement of the application, the security attribute of the session corresponding to the security requirement of the application.

The subscription server sends an obtaining request response message to the control plane node, and the response message may include the security attribute of the session, so that the control plane node receives the security attribute of the session corresponding to the security requirement of the application.

Manner (3): The control plane node receives an index from a policy decision node, and determines, based on the index, the security attribute of the session corresponding to the security requirement of the application.

The control plane node stores a table of a correspondence between an index and a security attribute of a session, as shown in Table 2.

TABLE 2

| Index | Security attribute of a session |
|---|---|
| 1 | X |
| 2 | Y |

The operator performs initialized configuration on the policy decision node, and configures a table of a correspondence between a security requirement of an application and an index in the control plane node, as shown in Table 3.

TABLE 3

| Security requirement of an application | Index |
|---|---|
| A | 1 |
| B | 2 |

The control plane node sends a security attribute obtaining request message to the policy decision node, and the obtaining request message may include a security requirement A of an application. The policy decision node determines, through querying in Table 3 based on the security requirement A of the application, that an index value of the security requirement A corresponding to the application is 1. The policy decision node sends an obtaining request response message to the control plane node, and the obtaining response message may include the index value 1. The control plane node determines, through querying in Table 2 based on the index value 1, a security attribute X of a session corresponding to the security requirement A of the application.

Optionally, the session establishment request message further includes a security capability of the UE.

The security capability of the UE may be a configuration policy of the UE itself. For example, in terms of the encrypted location, the configuration policy may include supporting only IP layer encryption and not supporting transport layer encryption by the UE; in terms of the key length, the configuration policy may support only 256 bits, or 128 bits, or 64 bits; in terms of the security algorithm, the configuration policy may support only the DES encryption algorithm, or support one or more of: the DES encryption algorithm, the AES encryption algorithm, the ZUC encryption algorithm, and the RSA encryption algorithm.

With reference to the foregoing three manners, the control plane node determines, based on the security requirement of the application and the security capability of the UE, the security attribute of the session corresponding to the security requirement of the application.

In an example, the control plane node recognizes, based on the security capability of the UE, whether the UE can support the security requirement of the application. If the control plane node recognizes that the UE can support the security requirement of the application, for example, the security capability of the UE is supporting IP layer encryption and the key length is 256 bits, and the security parameter included in the security requirement of the application is IP layer encryption, and the key length is 64 bits, the control plane node can determine the security attribute of the session corresponding to the security requirement of the application in the foregoing three manners.

In another implementation scenario, when the security attribute of the session is the security attribute of the slice corresponding to the session, the session establishment request message may include session management-network slice selection assistance information (session management-network slice selection assistance information, SM-NSSAI).

Optionally, step 230 includes: determining, by the control plane node based on the session management-network slice selection assistance information, the security attribute of the session corresponding to the security requirement of the application.

For example, the control plane node may determine, by using a local configuration policy, the security attribute of the slice corresponding to the security requirement of the application; or obtain the security attribute of the slice corresponding to the security requirement of the application from a subscription server; or determine, by obtaining an index from a policy decision node, the security attribute of the slice corresponding to the security requirement of the application, to determine the security attribute of the session corresponding to the security requirement of the application.

It should be noted that the control plane node may alternatively determine the security attribute of the session corresponding to the security requirement of the application in another manner. This is not limited in this embodiment of the present disclosure.

Optionally, the session establishment response message may further include user plane protocol stack indication information, the user plane protocol stack indication information is used to indicate a user plane protocol stack used by the session corresponding to the security requirement of the application, and the user plane protocol stack is used to decide an encapsulation format of the data of the application.

Optionally, the method further includes step 240.

Step 240: The UE sends the data of the application based on the security attribute of the session corresponding to the security requirement of the application.

In an example, the UE may determine the encapsulation format of the data of the application based on the encrypted location in the security attribute of the session. An example is described as follows:

If the encrypted location in the security attribute of the session is an IP field, to be specific, the IP field needs to be encrypted, the UE encrypts an IP layer when encapsulating the data of the application. The encapsulation manner of the UE may be shown in FIG. 3A. The data of the application is transmitted from an application layer to a physical layer through the IP layer, an encryption security layer, a transport layer, and a data link layer.

If the encrypted location in the security attribute of the session is a TCP field, to be specific, the TCP field needs to be encrypted (where the TCP protocol or the like may be used in a transport layer), the UE needs to encrypt the transport layer when encapsulating the data of the application. The encapsulation manner of the UE may be shown in FIG. 3B. The data of the application is transmitted from an application layer to a physical layer through an IP layer, the transport layer, an encryption security layer, and a data link layer.

If the security attribute of the session includes no encrypted location, the UE does not encrypt any layer when encapsulating the data of the application. The encapsulation manner of the UE may be shown in FIG. 3C. The data of the application is transmitted from an application layer to a physical layer through an IP layer, a transport layer, and a data link layer.

It can be learned that, the UE may encapsulate the data of the application based on the encapsulation format of the data of the application, generate a corresponding data packet, and send the data packet.

In still another implementation scenario, when the security attribute of the session is the security attribute of the slice corresponding to the session, the session establishment request message may include SM-NSSAI and the security requirement of the application. Optionally, step 230 includes: determining, by the control plane node based on the SM-NSSAI and the security requirement of the application, the security attribute of the session corresponding to the security requirement of the application.

The control plane node sends a session establishment response message to the UE. The session establishment response message includes the security attribute of the session corresponding to the security requirement of the application. Optionally, the session establishment response message includes indication information, but does not include the security attribute of the session corresponding to the security requirement of the application. The indication information is used to instruct the UE to send the data of the application based on the security requirement of the application. For example, when the security attribute corresponding to the session is the same as the security requirement of the application, the session establishment response message may include only the indication information but does not include the security attribute of the session corresponding to the security requirement of the application.

It can be learned from the foregoing that, the UE determines, based on the security requirement of the application, whether the session of the UE corresponds to the security requirement of the application. When the security attribute of the session corresponds to the security requirement of the application, the session is used to transmit service data of the application, to be specific, the session is reused, thereby improving utilization of the established session. When the security attribute of the session of the UE does not meet the security requirement of the application, a session establishment process is triggered to establish a session corresponding to the security requirement, to meet requirements of different services.

The following describes a method for UE to transmit the service data of the application when the security attribute of the session does not meet the security requirement of the application.

Figure 4:
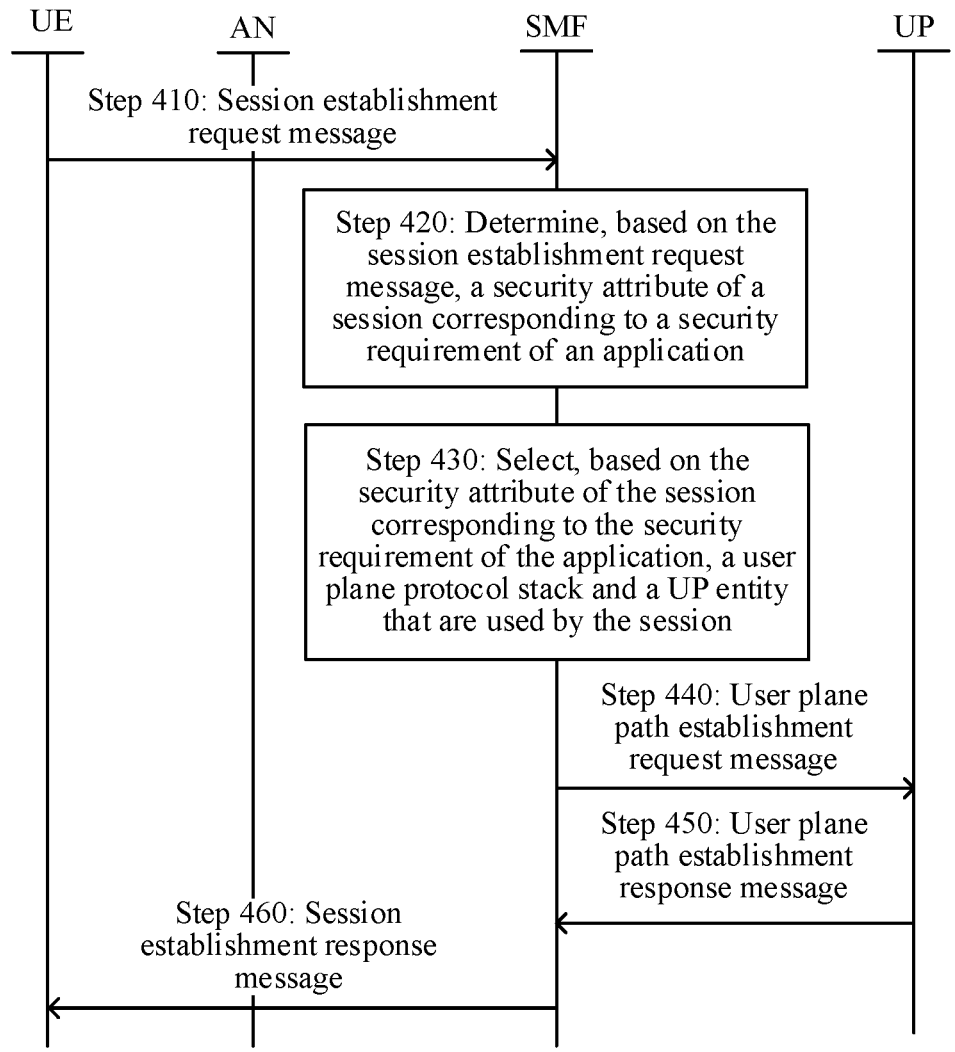
FIG. 4 is a signaling exchange diagram of another data transmission method according to an embodiment of the present disclosure.

FIG. 4 is a signaling exchange diagram of a data transmission method according to an embodiment of the present disclosure. In this embodiment, an SMF entity is used as an example of a control plane node, as detailed below.

Step 410: UE sends a session establishment request message to an SMF entity.

Optionally, the UE may send the session establishment request message to the SMF entity through an AN node and an AMF entity, and the session establishment request message is used to request to establish a session corresponding to a security requirement of an application, to perform data transmission.

Step 420: The SMF entity determines a security attribute of the session corresponding to the security requirement of the application based on the session establishment request message.

The session establishment request message may include the security requirement of the application.

In this case, the control plane node may determine, based on the security requirement of the application, the security attribute of the session corresponding to the security requirement of the application. For example, the control plane node may determine, by using a local configuration policy, the security attribute of the session corresponding to the security requirement of the application; obtain the security attribute of the session corresponding to the security requirement of the application from a subscription server; or determine, by obtaining an index from a policy decision node, the security attribute of the session corresponding to the security requirement of the application.

Optionally, in a slice scenario, the session establishment request message may further include session management-network slice selection assistance information (SM-NSSAI) for indicating a slice, so that a slice corresponding to the security requirement of the application is selected.

Step 430: The SMF selects, based on the security attribute of the session corresponding to the security requirement of the application, a user plane protocol stack and an UP entity that are used by the session.

Step 440: The SMF entity sends a user plane path establishment request message to the UP entity.

The user plane path establishment request message may be used to trigger establishment of a user plane path between the AN node and the UP entity.

The user plane path establishment request message may include the security attribute of the session corresponding to the security requirement of the application, to instruct the UP entity to use a proper user plane protocol stack.

Optionally, the user plane path establishment request message may further include user plane protocol stack indication information. The user plane protocol stack indication information may be used to instruct the UP entity to use a proper user plane protocol stack.

Step 450: The UP entity sends a user plane path establishment response message to the SMF entity.

Optionally, the user plane path establishment response message may include identification information of the UP entity, such as an IP address of the UP entity.

Step 460: The SMF entity sends a session establishment response message to the UE.

The session establishment response message may include the security attribute of the session corresponding to the security requirement of the application.

Figure 3A:
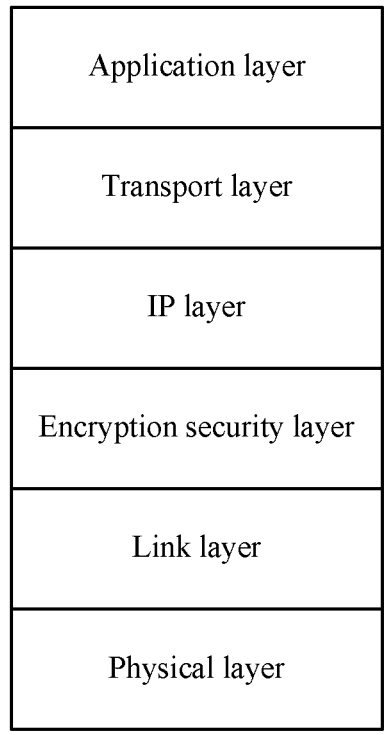
FIG. 3A is a schematic structural diagram of an encapsulation format of data according to an embodiment of the present disclosure.
Figure 3B:
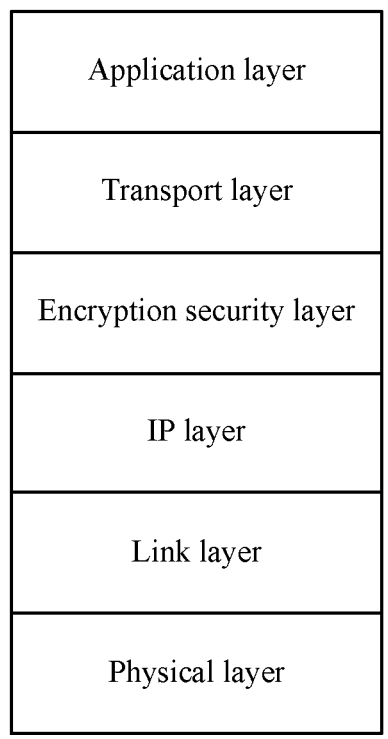
FIG. 3B is a schematic structural diagram of another encapsulation format of data according to an embodiment of the present disclosure.
Figure 3C:
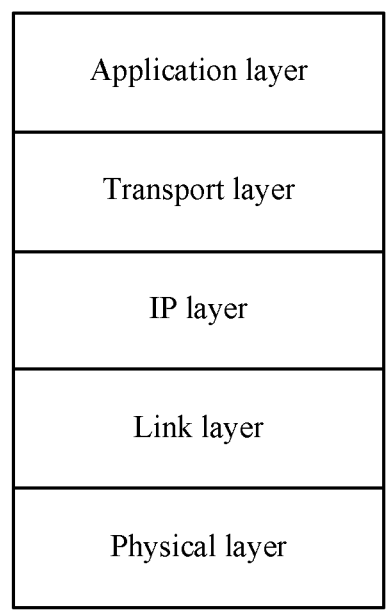
FIG. 3C is a schematic structural diagram of still another encapsulation format of data according to an embodiment of the present disclosure.

Optionally, the session establishment response message may further include user plane protocol stack indication information, the user plane protocol stack indication information is used to indicate a user plane protocol stack used by the session corresponding to the security requirement of the application, and the user plane protocol stack is used to decide an encapsulation format of data of the application, as shown in FIG. 3A, FIG. 3B, and FIG. 3C.

For example, the UE may encapsulate the data of the application based on the encapsulation format of the data of the application, generate a corresponding data packet, and transmit service data of the application.

Optionally, when the security attribute of the session corresponding to the security requirement of the application is a security attribute of a slice corresponding to the session corresponding to the security requirement of the application, the UE may obtain the security attribute of the slice corresponding to the session in a registration process.

Figure 5:
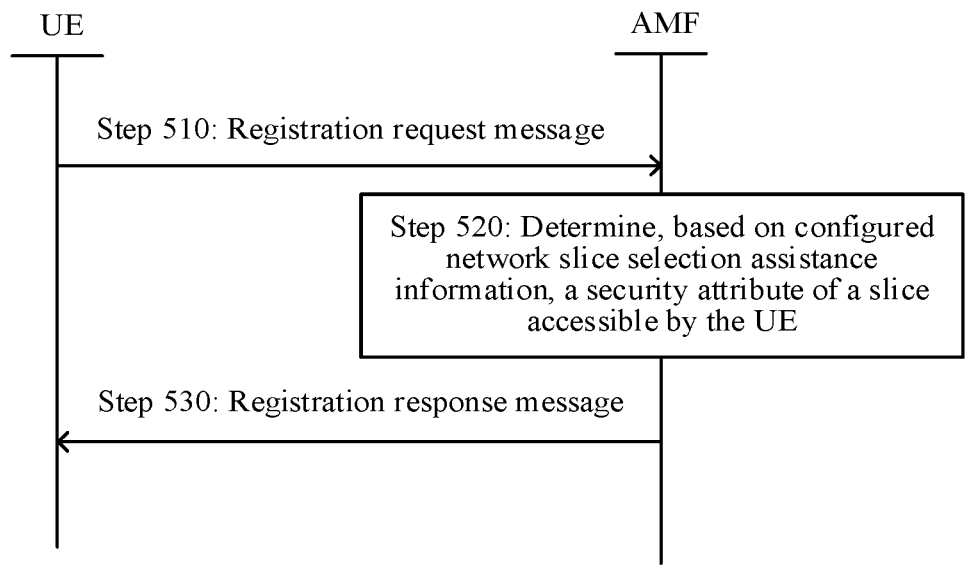
FIG. 5 is a signaling exchange diagram of still another data transmission method according to an embodiment of the present disclosure.

FIG. 5 is a signaling exchange diagram of still another data transmission method according to an embodiment of the present disclosure. In this embodiment, an AMF entity is used as an example of a control plane node, as detailed below.

Step 510: UE sends a registration request message to an AMF entity.

The UE may send the registration request message to the AMF entity through an AN node, and the registration request message may include configured network slice selection assistance information (configured network slice selection assistance information, Configured NSSAI).

Step 520: The AMF entity determines, based on the configured network slice selection assistance information, a security attribute of a slice accessible by the UE.

Before performing step 520, the AMF entity initiates an authentication and authorization process on the UE to complete the corresponding authentication and authorization process.

In an example, the AMF entity may obtain accessible network slice selection assistance information (accepted NSSAI) and the security attribute of the accessible slice based on the configured network slice selection assistance information. The accessible network slice selection assistance information may include at least one piece of session management-network slice selection assistance information.

Optionally, the AMF entity may alternatively obtain the accessible network slice selection assistance information and the security attribute of the accessible slice by using the following obtaining methods. The security attribute of the accessible slice may include a security attribute of at least one slice.

Method 1: After determining the accessible network slice selection assistance information based on the configured network slice selection assistance information, the AMF entity sends a security attribute obtaining request message to an SMF entity, and the security attribute obtaining request message may include the accessible network slice selection assistance information.

For example, the SMF entity obtains, based on the accessible network slice selection assistance information, the accessible slice corresponding to the accessible network slice selection assistance information, and the security attribute of the corresponding slice. The SMF entity sends a security attribute obtaining response message to the AMF entity, and the response message may include the accessible network slice selection assistance information and the security attribute of the accessible slice, so that the AMF entity obtains the security attribute of the accessible slice.

Method 2: After determining the accessible network slice selection assistance information based on the configured network slice selection assistance information, the AMF entity sends a security attribute obtaining request message to a policy decision node, and the security attribute obtaining request message includes the accessible network slice selection assistance information.

For example, the policy decision node may obtain, based on the accessible network slice selection assistance information, the accessible slice corresponding to the accessible network slice selection assistance information and the security attribute of the corresponding slice.

The policy decision node sends a security attribute obtaining response message to the AMF entity, and the response message may include the accessible network slice selection assistance information and the security attribute of the accessible slice, so that the AMF entity obtains the security attribute of the accessible slice.

Method 3: Based on the implementation process of Method 1, the AMF entity may further send a security attribute obtaining request message to the policy node through the SMF entity, so that the AMF entity obtains the accessible network slice selection assistance information and the security attribute of the accessible slice from the policy node through the SMF entity.

Optionally, the registration request message further includes a security capability of the UE.

With reference to the foregoing three methods, the AMF entity determines, based on the configured network slice selection assistance information and the security capability of the UE, the security attribute of the session corresponding to the security requirement of the application. For the detailed method description, refer to step 230, and details are not described herein again in this embodiment of the present disclosure.

Step 530: The AMF entity sends a registration response message to the UE.

The registration response message may include the security attribute of the accessible slice.

Optionally, the UE completes a registration process, to be specific, the UE obtains the accessible network slice selection assistance information and the security attribute of the accessible slice; and based on at least one piece of session management-network slice selection assistance information SM-NSSAI in the accessible network slice selection assistance information and based on a relationship between the at least one piece of session management-network slice selection assistance information and a service, the UE configures a table of a correspondence between a service of an application and a security attribute of a slice, as shown in Table 4.

TABLE 4

| Service | SM-NSSAI | Security attribute of a slice |
|---|---|---|
| APP 1 | SM-NSSAI 1 | Security attribute 1 |
| APP 2 | SM-NSSAI 1 | Security attribute 1 |
| APP 3 | SM-NSSAI 2 | Security attribute 2 |

In Table 4, the UE obtains, based on SM-NSSAI 1 corresponding to an APP 1, a security attribute 1 of a slice corresponding to the APP 1; the UE obtains, based on SM-NSSAI 1 corresponding to an APP 2, a security attribute 1 of a slice corresponding to the APP 2, to be specific, the APP 1 and the APP 2 have a same security requirement; and the UE obtains, based on SM-NSSAI 2 corresponding to an APP 3, a security attribute 2 of a slice corresponding to the APP 3.

Optionally, the UE may alternatively obtain, by using a preset policy configured by an operator, the security attribute of the slice corresponding to the session, as shown in Table 5.

TABLE 5

| Default policy | Service | SM-NSSAI | Security attribute of a slice |
|---|---|---|---|
| Policy 1 | APP 1 | SM-NSSAI 1 | Security attribute 1 |
| Policy 2 | APP 2 | SM-NSSAI 1 | Security attribute 1 |
| Policy 3 | APP 3 | SM-NSSAI 2 | Security attribute 2 |

In Table 5, in default policies, a policy 1, a policy 2, and a policy 3 are three policies configured by the operator and stored in the UE.

In the first example, when the UE starts an APP 1, the UE determines, based on a correspondence between the APP 1 and SM-NSSAI 1 and a correspondence between the SM-NSSAI 1 and a security attribute of a slice, that the security attribute of the slice corresponding to the APP 1 is a security attribute 1.

In the second example, when the UE starts an APP 2, the UE determines, based on a correspondence between the APP 2 and SM-NSSAI 1 and the correspondence between the SM-NSSAI 1 and a security attribute of a slice, that the security attribute of the slice corresponding to the APP 2 is the security attribute 1. It may be understood that, because the security attribute of the slice corresponding to the APP 1 is the security attribute 1 and the security attribute of the slice corresponding to the APP 2 is also the security attribute 1, the APP 1 and the APP 2 have a same security requirement.

In the third example, when the UE starts an APP 3, the UE determines, based on a correspondence between the APP 3 and SM-NSSAI 2 and a correspondence between the SM-NSSAI 2 and a security attribute of a slice, that the security attribute of the slice corresponding to the APP 3 is a security attribute 2.

Therefore, when the UE starts an application, the UE determines a security requirement of the application, to be specific, a security attribute of a slice corresponding to the application, based on a correspondence between an application and SM-NSSAI and a correspondence between the SM-NSSAI and a security attribute of a slice. Then the UE determines whether any session exists in the slice corresponding to the application, and if one or more sessions exist, it indicates that a security attribute corresponding to the session corresponds to the security requirement of the application, so that the UE transmits data of the application by using one of the sessions; if no session exists, the UE rejects the application. To be specific, the UE starts an application. When a security attribute of at least one of the one or more sessions meets the security requirement of the application, the UE sends data of the application through one of the at least one session. The security attribute of the session herein is a security attribute of the slice corresponding to the session.

It should be noted that in the examples of Table 4 and Table 5, the security attribute of the slice may be a part of the SM-NSSAI, for example, exist in a field form in the SM-NSSAI, to be specific, some fields of the SM-NSSAI are used to identify the security attribute of the slice.

Figure 6:
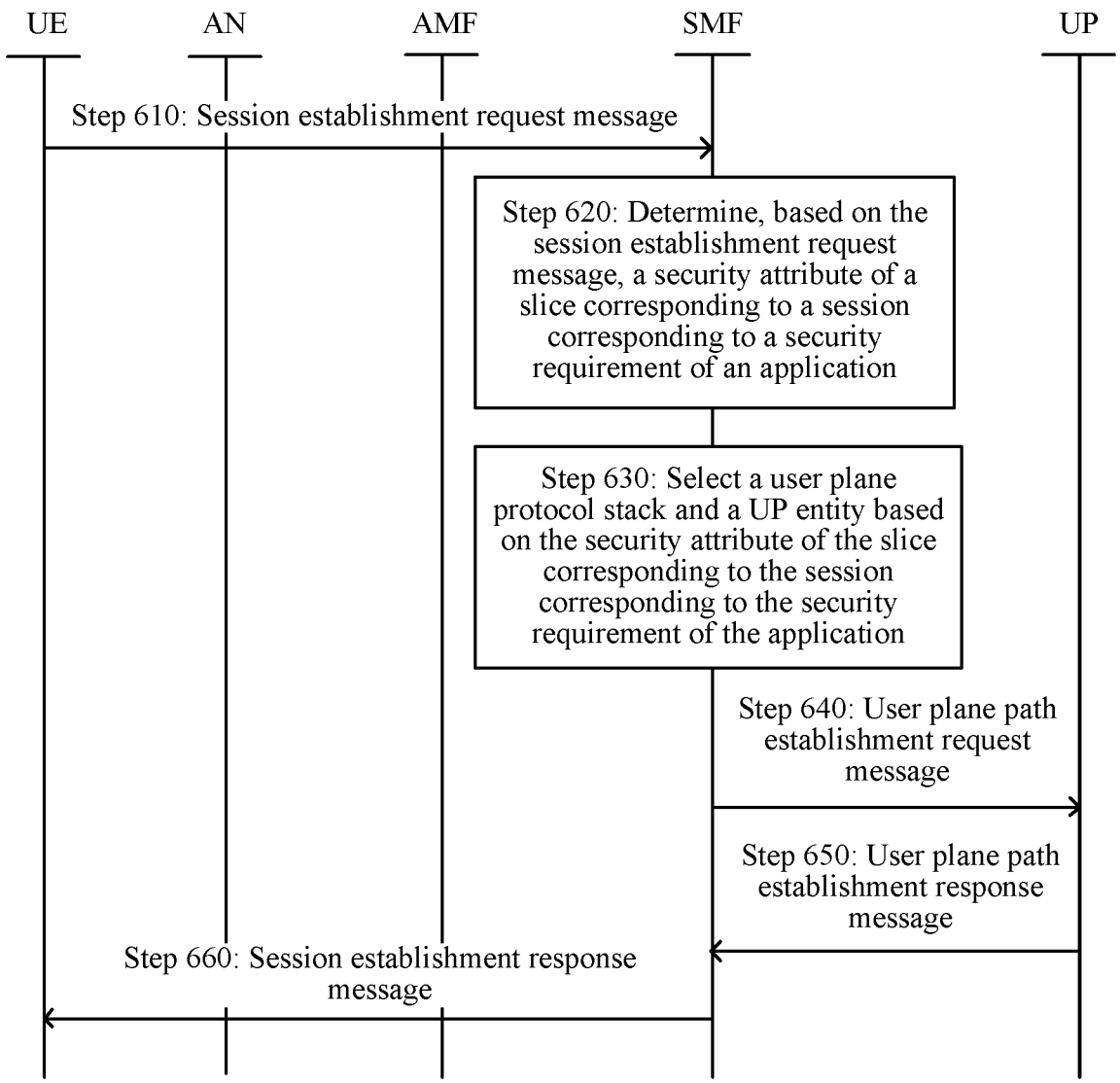
FIG. 6 is a signaling exchange diagram of still another data transmission method according to an embodiment of the present disclosure.

FIG. 6 is a signaling exchange diagram of still another data transmission method according to an embodiment of the present disclosure. As shown in FIG. 6, the method may include the following steps.

Step 610: UE sends a session establishment request message to an SMF entity.

The session establishment request message may be used to request to establish a session corresponding to a security requirement of an application.

Optionally, the UE may send a session establishment request to the SMF entity through an AN node and an AMF entity.

Step 620: The SMF entity determines, based on the session establishment request message, a security attribute of a slice corresponding to the session corresponding to the security requirement of the application.

The session establishment request message may include SM-NSSAI. Further, the SMF entity may determine, based on the SM-NSSAI, the security attribute of the slice corresponding to the SM-NSSAI.

Optionally, the session establishment request message further includes a security capability of the UE. Further, the SMF entity may determine, based on the SM-NSSAI and the security capability of the UE, the security attribute of the slice corresponding to the SM-NSSAI. For a specific implementation method, refer to the description of step 230, and details are not described herein again in this embodiment of the present disclosure.

Optionally, the method used by the SMF entity to determine, based on the SM-NSSAI, the security attribute of the slice corresponding to the session corresponding to the security requirement of the application may be implemented by referring to the obtaining method in step 520, and details are not described herein again in this embodiment of the present disclosure.

Step 630: The SMF selects a user plane protocol stack and an UP entity based on the security attribute of the slice corresponding to the session corresponding to the security requirement of the application.

The implementation process of this step is similar to the implementation process of step 430, and details are not described herein again.

Step 640: The SMF entity sends a user plane path establishment request message to the UP entity.

The user plane path establishment request message is used to trigger establishment of a user plane path between the AN node and the UP entity.

Optionally, the user plane path establishment request message may include the security attribute of the slice, to indicate a security attribute of a current session to the UP entity, and instruct the UP entity to use a proper user plane protocol stack based on the security attribute of the session.

Optionally, the user plane path establishment request may further include user plane protocol stack indication information that is used to instruct a target UP entity to use a proper user plane protocol stack.

Step 650: The UP entity sends a user plane path establishment response message to the SMF entity.

The user plane path establishment response message is used to establish a user plane path between the AN node and the UP entity.

Optionally, the user plane path establishment response message may include identification information of the UP entity, such as an IP address of the UP entity.

Step 660: The SMF entity sends a session establishment response message to the UE.

The session establishment response message may include a security attribute of a slice corresponding to SM-NSSAI.

Optionally, the session establishment response message includes indication information, but does not include the security attribute of the slice corresponding to the SM-NSSAI. The indication information may be used to instruct the UE to send data of the application based on the security requirement of the application. For example, when the security attribute that is determined by the SMF entity and that is of the slice corresponding to the SM-NSSAI is the same as the security requirement of the application, the session establishment response message may include only the indication information.

Optionally, the session establishment response message may further include user plane protocol stack indication information, and the user plane protocol stack indication information is used to indicate a user plane protocol stack used by the session corresponding to the security requirement of the application, and the user plane protocol stack may be used to decide an encapsulation format of the data of the application.

For example, the UE may encapsulate the data of the application based on the encapsulation format of the data of the application, generate a corresponding data packet, and transmit service data of the application.

After the UE starts an application, the UE selects SM-NSSAI based on a security requirement of an application, and then determines, based on a correspondence between SM-NSSAI and a security attribute of a slice, a security attribute of a slice corresponding to the security requirement of the application, to establish a new session to perform data transmission, thereby reducing an unnecessary signaling exchange caused by the new session.

Figure 7:
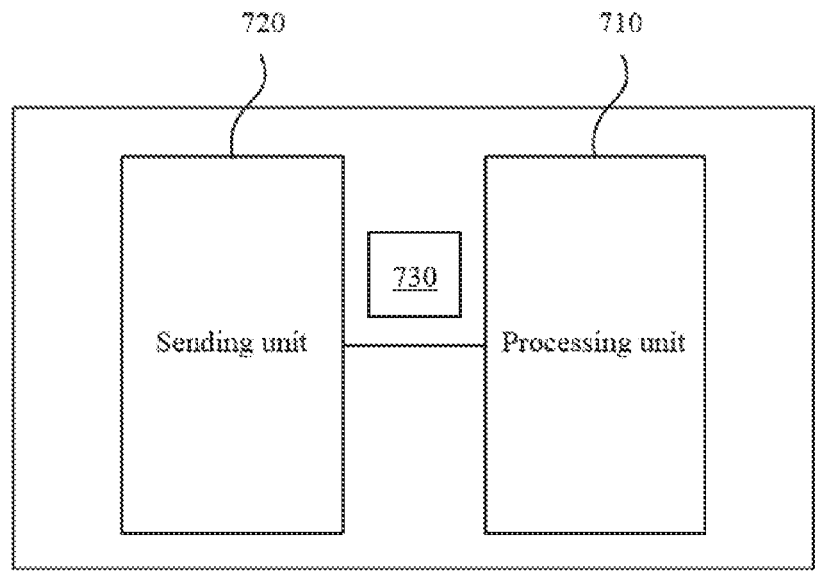
FIG. 7 is a schematic structural diagram of user equipment according to an embodiment of the present disclosure.

Corresponding to the foregoing method, UE is provided in an embodiment of the present disclosure. As shown in FIG. 7, the user equipment may include:

a processing unit 710, configured to determine a security attribute of a session of UE; and a sending unit 720, configured to send a session establishment request message to a control plane node when the security attribute of the session of the UE does not meet a security requirement of an application, where the session establishment request message is used to request to establish a session corresponding to the security requirement of the application.

For a manner of determining the security attribute of the session of the UE, refer to the related description in step 210, and details are not described again. In addition, the control plane node may be an AMF entity, or an SMF entity, or the control plane node includes both an AMF entity and an SMF entity.

Optionally, the security attribute includes at least one security parameter of: a security algorithm, a key length, and an encrypted location. The security requirement of the application includes at least one security parameter of: a security algorithm, a key length, and an encrypted location.

Optionally, the UE further includes a receiving unit 730. The receiving unit 730 is configured to receive a session establishment response message from the control plane node, and the session establishment response message includes a security attribute of the session corresponding to the security requirement of the application.

The sending unit 720 is further configured to send data of the application based on the security attribute of the session corresponding to the security requirement of the application.

Optionally, the processing unit 710 is further configured to determine an encapsulation format of the data of the application based on the encrypted location, and generate a data packet based on the encapsulation format of the data of the application and the data of the application.

The sending unit 720 is further configured to send the data packet.

Optionally, the security attribute of the session corresponding to the security requirement of the application is a security attribute of a slice corresponding to the session corresponding to the security requirement of the application.

Optionally, the session establishment response message further includes user plane protocol stack indication information, and the user plane protocol stack indication information is used to indicate the encapsulation format of the data of the application.

Optionally, the security attribute of the session is the security attribute of the slice corresponding to the session.

Optionally, the sending unit 720 is further configured to send a registration request message to the control plane node.

The receiving unit 730 is further configured to receive a registration response message from the control plane node, and the registration response message includes a security attribute of a slice accessible by the UE, and the security attribute of the slice accessible by the UE includes the security attribute of the slice corresponding to the session.

Optionally, the sending unit 720 is further configured to send, when a security attribute of at least one of the session meets the security requirement of the application, the data of the application through one of the at least one session.

The functions of the function units of the user equipment may be implemented by using the steps of the UE in the foregoing method. Therefore, the specific working process of the user equipment provided in the foregoing embodiment of the present disclosure is not described herein again.

Figure 8:
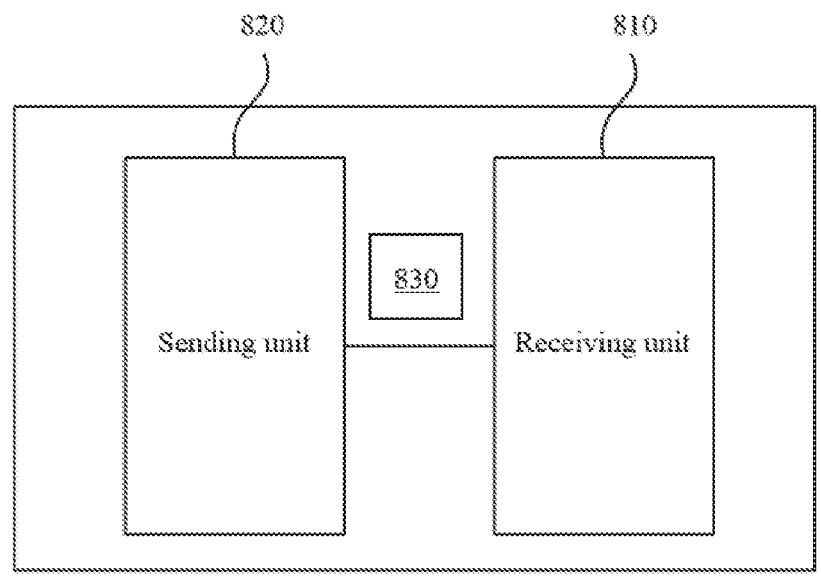
FIG. 8 is a schematic structural diagram of a control plane node according to an embodiment of the present disclosure.

Corresponding to the foregoing method, a control plane node is provided in an embodiment of the present disclosure. The control plane node may be an AMF entity or an SMF entity, or the control plane node includes both an AMF entity and an SMF entity. As shown in FIG. 8, the control plane node may include a receiving unit 810 and a sending unit 820.

The receiving unit 810 is configured to receive a session establishment request message sent by UE, and the session establishment request message is used to request to establish a session corresponding to a security requirement of an application of the UE.

The sending unit 820 is configured to send a session establishment response message to the UE based on the session establishment request message, and the session establishment response message includes a security attribute of the session corresponding to the security requirement of the application.

Optionally, the security attribute includes at least one security parameter of: a security algorithm, a key length, and an encrypted location. The security requirement of the application includes at least one security parameter of: a security algorithm, a key length, and an encrypted location.

Optionally, the security attribute of the session corresponding to the security requirement of the application is a security attribute of a slice corresponding to the session corresponding to the security requirement of the application.

Optionally, the control plane node further includes a processing unit 830, and the session establishment request message includes session management-network slice selection assistance information.

The processing unit 830 is configured to determine, based on the session management-network slice selection assistance information, the security attribute of the session corresponding to the security requirement of the application.

Optionally, the session establishment request message includes the security requirement of the application.

The processing unit 830 is further configured to determine, based on the security requirement of the application, the security attribute of the session corresponding to the security requirement of the application.

Optionally, the session establishment request message further includes a security capability of the UE; and the processing unit 830 is further configured to determine, based on the security requirement of the application and the security capability of the UE, the security attribute of the session corresponding to the security requirement of the application.

Optionally, the processing unit 830 is further configured to determine, based on a local configuration policy, the security attribute of the session corresponding to the security requirement of the application; or the receiving unit 810 is further configured to receive the security attribute of the session corresponding to the security requirement of the application from a subscription service unit; or the receiving unit 810 is further configured to receive an index from a policy decision node, and determine, based on the index, the security attribute of the session corresponding to the security requirement of the application.

Optionally, the session establishment response message further includes user plane protocol stack indication information, and the user plane protocol stack indication information is used to indicate a user plane protocol stack used by the session corresponding to the security requirement of the application.

Optionally, the receiving unit 810 is further configured to receive a registration request message from the UE, and the registration request message includes configured network slice selection assistance information.

The processing unit 830 is further configured to determine, based on network slice selection assistance information, a security attribute of a slice accessible by the UE.

The sending unit 820 is further configured to send a registration response message to the UE, and the registration response message includes the security attribute of the slice accessible by the UE.

The functions of the function units of the control plane node may be implemented by using the steps of the control plane node in the foregoing method. Therefore, the specific working process of the control plane node provided in the foregoing embodiment of the present disclosure is not described herein again.

Figure 9:
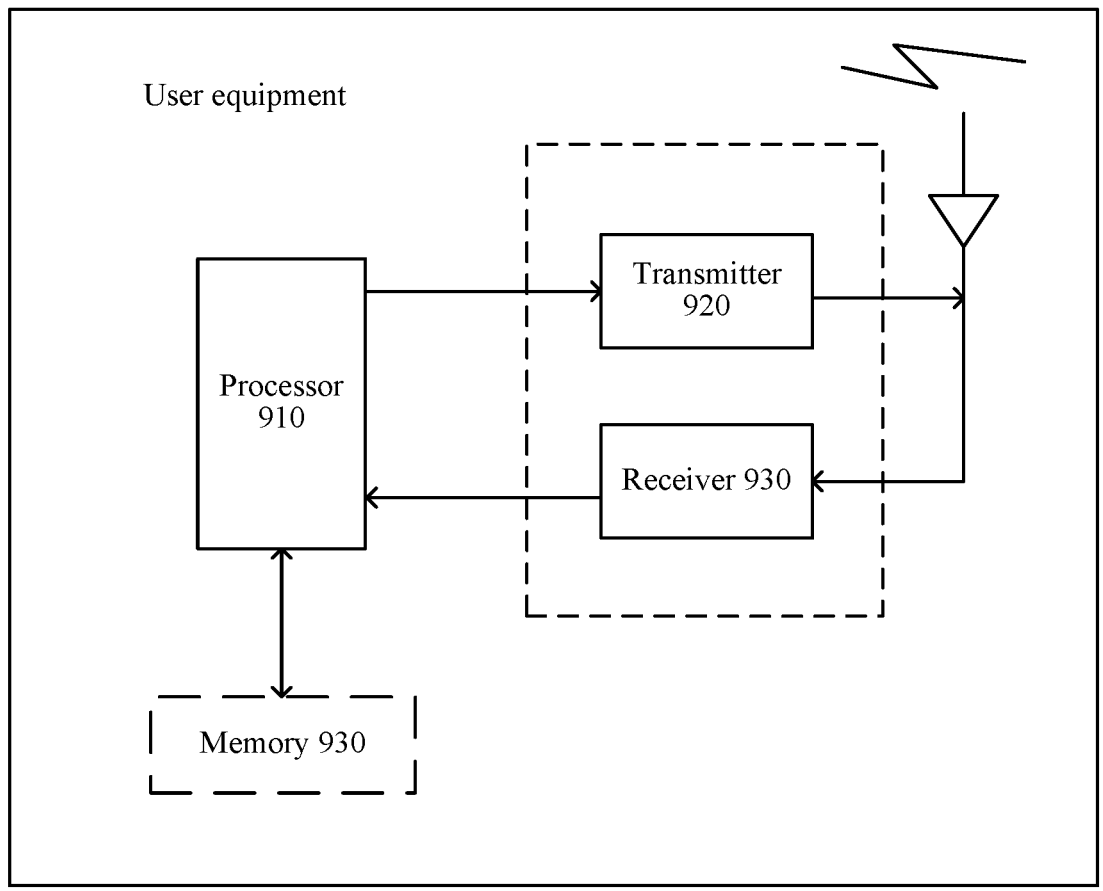
FIG. 9 is a schematic structural diagram of another user equipment according to an embodiment of the present disclosure.

FIG. 9 is a schematic structural diagram of another user equipment according to an embodiment of the present disclosure.

The user equipment includes at least a processor 910, a transmitter 920, and a receiver 930.

Optionally, the user equipment may further include a memory 930. Each of the transmitter 920 and the receiver 930 may be an antenna.

The processor 910 may be a central processing unit (CPU), or a combination of a CPU and a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof. The processor 910 is configured to: control an entire network device and process a signal.

The memory 930 may include a volatile memory such as a random access memory (RAM); and the memory 930 may also include a non-volatile memory such as a read-only memory (ROM), a flash memory, a hard disk, or a solid state hard disk. The memory 930 may further include a combination of the foregoing types of memories. The memory 930 is configured to store various applications, operating systems, and data. The memory 930 can transmit the stored data to the processor 910.

It may be understood that, the memory 930 may be integrated into the processor 910 or exist independently.

The memory 930 is configured to store a program.

The processor 910 is configured to execute the program in the memory 930 to perform the steps of the UE in the foregoing method embodiments.

In an example, the processor 910 is configured to determine a security attribute of a session of UE. The processor 910 is further configured to: when the security attribute of the session of the UE does not meet a security requirement of an application, send a session establishment request message to a control plane node by using the transmitter 920, where the session establishment request message is used to request to establish a session corresponding to the security requirement of the application.

For implementations and beneficial effects of resolving problems by the components of the user equipment in the foregoing embodiment, refer to the foregoing method implementations and beneficial effects thereof. Therefore, details are not described herein again.

Figure 10:
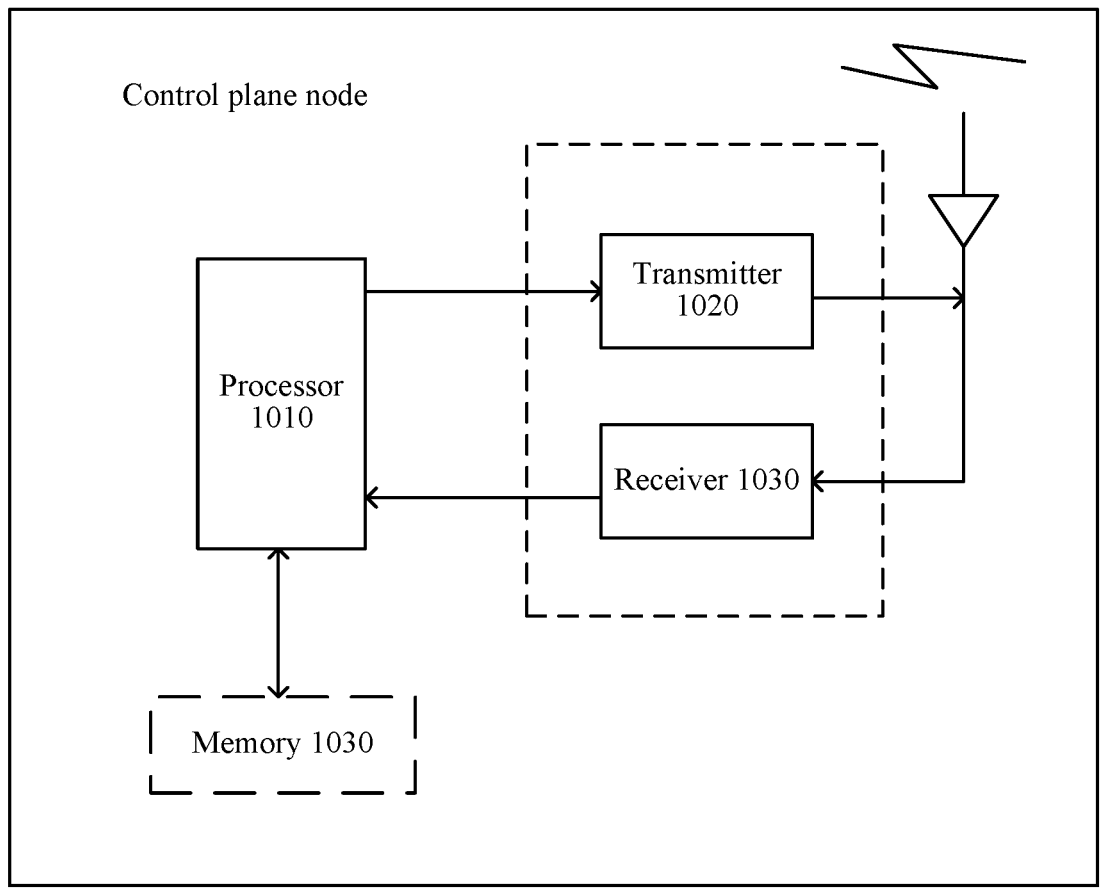
FIG. 10 is a schematic structural diagram of another control plane node according to an embodiment of the present disclosure.

FIG. 10 is a schematic structural diagram of another control plane node according to an embodiment of the present disclosure. The control plane node may be an AMF entity or an SMF entity; or the control plane node includes both an AMF entity and an SMF entity.

The control plane node includes at least a processor 1010, a transmitter 1020, and a receiver 1030.

Optionally, the control plane node may further include a memory 1030. Each of the transmitter 1020 and the receiver 1030 may be an antenna, namely, a wireless communications interface or a wired communications interface. This is not limited herein. When the transmitter 1020 and the receiver 1030 are wired communications interfaces, the transmitter 1020 and the receiver 1030 may be a same communications interface or different communication interfaces.

The processor 1010 may be a CPU, or a combination of a CPU and a hardware chip. The hardware chip may be an ASIC, a PLD, or a combination thereof. The PLD may be a CPLD, an FPGA, a GAL, or any combination thereof. The processor 1010 is configured to: control an entire network device and process a signal.

The memory 1030 may include a volatile memory such as a random access memory (RAM); and the memory 1030 may also include a non-volatile memory such as a read-only memory (ROM), a flash memory, a hard disk, or a solid state hard disk. The memory 1030 may further include a combination of the foregoing types of memories. The memory 1030 is configured to store various applications, operating systems, and data. The memory 1030 can transmit the stored data to the processor 1010.

It may be understood that, the memory 1030 may be integrated into the processor 1010 or exist independently.

The memory 1030 is configured to store a program.

The processor 1010 is configured to execute the program in the memory 1030 to perform the steps of the control plane node in the foregoing method embodiments.

In an example, the processor 1010 is configured to receive, by using the receiver 1030, a session establishment request message sent by UE, and the session establishment request message is used to request to establish a session corresponding to a security requirement of an application of the UE. The processor 1010 is further configured to send, based on the session establishment request message, a session establishment response message to the UE by using the transmitter 1020, and the session establishment response message includes a security attribute of the session corresponding to the security requirement of the application.

For implementations and beneficial effects of resolving problems by the components of the control plane node in the foregoing embodiment, refer to the foregoing method implementations and beneficial effects thereof. Therefore, details are not described herein again.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person of ordinary skill in the art may understand that all or some of the steps in each of the foregoing method of the embodiments may be implemented by a program instructing a processor. The program may be stored in a computer readable storage medium. The storage medium may be a non-transitory medium, such as a random access memory, a read-only memory, a flash memory, a hard disk, a solid state drive, a magnetic tape, a floppy disk, an optical disc, and any combination thereof.

The foregoing descriptions are merely examples of specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
   determining, by user equipment (UE), a security attribute of a session of the UE, wherein the security attribute of the session is a security attribute of a slice corresponding to the session;
   starting, by the UE, an application having a security requirement;
   when the security attribute of the session is lower than the security requirement of the application, determining, by the UE, that the security attribute of the session does not meet the security requirement of the application; and
   sending, by the UE, a session establishment request message to a control plane node, wherein the session establishment request message is used to request to establish a session corresponding to the security requirement of the application, wherein the session establishment request message comprises a security capability of the UE and the security requirement of the application, wherein the session establishment request message comprises a supported layer, a supported key length, and a supported security algorithm.

2. The method according to claim 1, wherein the security attribute comprises at least one security parameter of: a security algorithm, a key length, or an encrypted location; and the security requirement of the application comprises at least one security parameter of: a security algorithm, a key length, or an encrypted location.

3. The method according to claim 1, wherein after the sending, by the UE, a session establishment request message to a control plane node, the method further comprises:
   receiving, by the UE, a session establishment response message from the control plane node, wherein the session establishment response message comprises a security attribute of the session corresponding to the security requirement of the application; and
   sending, by the UE, data of the application based on the security attribute of the session corresponding to the security requirement of the application.

4. The method according to claim 3, wherein the security attribute of the session corresponding to the security requirement of the application comprises an encrypted location, and the sending, by the UE, data of the application based on the security attribute of the session corresponding to the security requirement of the application comprises:
   determining, by the UE, an encapsulation format of the data of the application based on the encrypted location; and
   generating, by the UE, a data packet based on the encapsulation format of the data of the application and the data of the application, and sending the data packet.

5. The method according to claim 3, wherein the security attribute of the session corresponding to the security requirement of the application is a security attribute of a slice corresponding to the session corresponding to the security requirement of the application.

6. The method according to claim 3, wherein the session establishment response message further comprises user plane protocol stack indication information, and the user plane protocol stack indication information is used to indicate the encapsulation format of the data of the application.

7. The method according to claim 1, wherein before the determining, by a UE, a security attribute of a session of the UE, the method further comprises:
   sending, by the UE, a registration request message to the control plane node; and
   receiving, by the UE, a registration response message from the control plane node, wherein the registration response message comprises a security attribute of a slice accessible by the UE, and the security attribute of the slice accessible by the UE comprises the security attribute of the slice corresponding to the session.

8. The method according to claim 1, wherein the session comprises at least one session, the method further comprising:
   when a security attribute of the at least one session meets the security requirement of the application, sending, by the UE, data of the application through one of the at least one session.

9. An apparatus, comprising a transmitter, a non-transitory computer readable memory storing instructions and a processor, wherein when the processor executes the instructions, steps are performed comprising:
   determine a security attribute of a session of user equipment (UE) wherein the security attribute of the session is a security attribute of a slice corresponding to the session;
   start an application having a security requirement;
   when the security attribute of the session is lower than the security requirement of the application, determine that the security attribute of the session does not meet the security requirement of the application; and
   send a session establishment request message to a control plane node by using the transmitter, wherein the session establishment request message is used to request to establish a session corresponding to the security requirement of the application, wherein the session establishment request message comprises a security capability of the UE and the security requirement of the application, wherein the session establishment request message comprises a supported layer, a supported key length, and a supported security algorithm.

10. The apparatus according to claim 9, wherein the security attribute comprises at least one security parameter of: a security algorithm, a key length, and an encrypted location; or the security requirement of the application comprises at least one security parameter of: a security algorithm, a key length, or an encrypted location.

11. The apparatus according to claim 9, further comprising a receiver; and
   the receiver is configured to receive a session establishment response message from the control plane node, wherein the session establishment response message comprises a security attribute of the session corresponding to the security requirement of the application; and
   the steps further comprise send, based on the security attribute of the session corresponding to the security requirement of the application, data of the application by using the transmitter.

12. The apparatus according to claim 9, wherein the session comprises at least one session, and wherein the transmitter is further configured to send, when a security attribute of the at least one session meets the security requirement of the application, the data of the application through one of the at least one session.

13. A non-transitory computer readable medium having processor-executable instructions stored there on, wherein the processor-executable instructions, when executed, facilitate a data transmission method, comprising:
   determining, by user equipment (UE), a security attribute of a session of the UE, wherein the security attribute of the session is a security attribute of a slice corresponding to the session;
   starting, by the UE, an application having a security requirement;
   when the security attribute of the session is lower than the security requirement of the application, determining, by the UE, that the security attribute of the session does not meet the security requirement of the application; and
   sending, by the UE, a session establishment request message to a control plane node, wherein the session establishment request message is used to request to establish a session corresponding to the security requirement of the application, wherein the session establishment request message comprises a security capability of the UE and the security requirement of the application, wherein the session establishment request message comprises a supported layer, a supported key length, and a supported security algorithm.

14. The non-transitory computer readable medium according to claim 13, wherein the security attribute comprises at least one security parameter of: a security algorithm, a key length, or an encrypted location; and the security requirement of the application comprises at least one security parameter of: a security algorithm, a key length, or an encrypted location.

15. The non-transitory computer readable medium according to claim 13, wherein after the sending, by the UE, a session establishment request message to a control plane node, the method further comprises:
   receiving, by the UE, a session establishment response message from the control plane node, wherein the session establishment response message comprises a security attribute of the session corresponding to the security requirement of the application; and
   sending, by the UE, data of the application based on the security attribute of the session corresponding to the security requirement of the application.

16. The non-transitory computer readable medium according to claim 15, wherein the security attribute of the session corresponding to the security requirement of the application comprises an encrypted location, and the sending, by the UE, data of the application based on the security attribute of the session corresponding to the security requirement of the application comprises:
   determining, by the UE, an encapsulation format of the data of the application based on the encrypted location; and
   generating, by the UE, a data packet based on the encapsulation format of the data of the application and the data of the application, and sending the data packet.

17. The non-transitory computer readable medium according to claim 15, wherein the security attribute of the session corresponding to the security requirement of the application is a security attribute of a slice corresponding to the session corresponding to the security requirement of the application.

18. The non-transitory computer readable medium according to claim 15, wherein the session establishment response message further comprises user plane protocol stack indication information, and the user plane protocol stack indication information is used to indicate the encapsulation format of the data of the application.

19. The non-transitory computer readable medium according to claim 13, wherein before the determining, by a UE, a security attribute of a session of the UE, the method further comprises:
  sending, by the UE, a registration request message to the control plane node; and
  receiving, by the UE, a registration response message from the control plane node, wherein the registration response message comprises a security attribute of a slice accessible by the UE, and the security attribute of the slice accessible by the UE comprises the security attribute of the slice corresponding to the session.

20. The non-transitory computer readable medium according to claim 13, wherein the session comprises at least one session, the method further comprising:
  when a security attribute of the at least one session meets the security requirement of the application, sending, by the UE, data of the application through one of the at least one session.

* * * * *

UNITED STATES PATENT AND TRADEMARK OFFICE
CERTIFICATE OF CORRECTION

PATENT NO. : 11,523,274 B2
APPLICATION NO. : 16/586373
DATED : December 6, 2022
INVENTOR(S) : Ni et al.

It is certified that error appears in the above-identified patent and that said Letters Patent is hereby corrected as shown below:

On the Title Page

Page 2: item (56) Other Publications, Right-Hand Column, Line 6: ""3d Generation Partnership Project;Technical Specification Group" should read -- "3rd Generation Partnership Project;Technical Specification Group --.

In the Claims

Claim 9: Column 23, Line 32: "ment (UE) wherein the security attribute of the session" should read -- ment (UE), wherein the security attribute of the session --.

Signed and Sealed this
Ninth Day of May, 2023

Katherine Kelly Vidal
*Director of the United States Patent and Trademark Office*